(12) United States Patent
Yu et al.

(10) Patent No.: US 12,190,184 B1
(45) Date of Patent: *Jan. 7, 2025

(54) EXCHANGE COUPLED AMORPHOUS RIBBONS FOR TELEPHONIC DEVICES

(71) Applicant: Dynamics Inc., Cheswick, PA (US)

(72) Inventors: Jun Yu, Pittsburgh, PA (US); James H. Workley, Imperial, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/336,806

(22) Filed: Jun. 2, 2021

Related U.S. Application Data

(63) Continuation of application No. 16/134,940, filed on Sep. 18, 2018, now Pat. No. 11,062,188, which is a continuation of application No. 14/658,184, filed on Mar. 14, 2015, now Pat. No. 10,108,891.

(60) Provisional application No. 61/968,869, filed on Mar. 21, 2014.

(51) Int. Cl.
*G06K 19/06* (2006.01)

(52) U.S. Cl.
CPC ............... *G06K 19/06206* (2013.01)

(58) Field of Classification Search
CPC ............................................. G06K 19/06206
See application file for complete search history.

(56) References Cited

U.S. PATENT DOCUMENTS

| | | | | |
|---|---|---|---|---|
| 5,003,409 A * | 3/1991 | Ishiguro | ................ | G11B 5/70 360/2 |
| 5,565,849 A * | 10/1996 | Ho | ................ | H01F 1/15341 148/108 |
| 5,825,290 A * | 10/1998 | Lian | ................ | G08B 13/2408 148/307 |
| 5,956,073 A * | 9/1999 | Jin | ................ | H01F 17/04 336/182 |
| 9,495,990 B2 * | 11/2016 | Kang | ................ | G11B 5/7368 |
| 10,108,891 B1 * | 10/2018 | Yu | ................ | G06K 19/06206 |
| 11,062,188 B1 * | 7/2021 | Yu | ................ | G06K 19/06206 |
| 2005/0283988 A1 * | 12/2005 | Sato | ................ | G01C 17/38 33/356 |
| 2006/0127701 A1 * | 6/2006 | Ruigrok | ................ | H01F 41/302 427/127 |

(Continued)

FOREIGN PATENT DOCUMENTS

JP       2002107684 A   *   4/2002

*Primary Examiner* — Christle I Marshall
(74) *Attorney, Agent, or Firm* — Morris Law Group; Robert W. Morris

(57) ABSTRACT

Dynamic magnetic stripe communications devices may include a coil. An exchange coupled amorphous material may be inside the coil, for example, in the form of a ribbon. The exchange coupled amorphous material may include magnetically hard crystallites embedded a soft magnetic amorphous matrix and/or at least one crystalline surface layer. A device may include a dynamic magnetic stripe communications device including one or more exchange coupled amorphous ribbons. The device may include more than one exchange coupled amorphous ribbon. Amorphous ribbons and/or layers of amorphous ribbons may be stacked (e.g., in alignment to one another) and/or offset at different heights. The ribbons may be in a single domain state without an external magnetic field, for example, an external magnetic field from a permanent magnet. The device may not include a permanent magnet.

10 Claims, 6 Drawing Sheets

(56) References Cited

U.S. PATENT DOCUMENTS

2014/0027869 A1\* 1/2014 Lee .......................... G11C 11/15
257/421

\* cited by examiner

EXCHANGE COUPLED AMORPHOUS RIBBONS FOR TELEPHONIC DEVICES

CROSS-REFERENCE TO RELATED APPLICATION

This application is a continuation of U.S. patent application Ser. No. 16/134,940, titled "EXCHANGE COUPLED AMORPHOUS RIBBONS FOR ELECTRONIC STRIPES," filed on Sep. 18, 2018 which is a continuation of U.S. patent application Ser. No. 14/658,184, titled "EXCHANGE COUPLED AMORPHOUS RIBBONS FOR ELECTRONIC STRIPES," filed on Mar. 14, 2015, which claims the benefit of U.S. Provisional Patent Application No. 61/968,869, titled "EXCHANGE COUPLED AMORPHOUS RIBBONS FOR ELECTRONIC STRIPES," filed Mar. 21, 2014, each of which is hereby incorporated by reference herein in its entirety.

BACKGROUND OF THE INVENTION

This invention relates to magnetic cards, devices and payment systems.

SUMMARY OF THE INVENTION

According to example embodiments, a device may include a dynamic magnetic stripe communications device. According to some example embodiments, the dynamic magnetic stripe communications device may include at least one coil and an exchange coupled amorphous material. According to other example embodiments, the device may include a display. According to still other example embodiments, the device may include a read-head detector. According to yet other example embodiments the device may include a button. According still yet other example embodiments, the device may include a light emitting diode. According to further example embodiments, the exchange coupled amorphous material may include magnetically hard crystallites embedded in a soft magnetic amorphous matrix. According to still further example embodiments, the exchange coupled amorphous material may include at least one crystalline surface layer. According to yet further example embodiments, the device may include a plurality of exchange coupled amorphous material ribbons. According to still yet further example embodiments, the exchange coupled amorphous material may be a soft magnetic material. According to at least some example embodiments, the exchange coupled amorphous material may be at least part of a material ribbon, and the material ribbon may be part of a layer of material ribbons. According to at least one example embodiment, the exchange coupled amorphous material may be at least part of a material ribbon, and the device may include a plurality of stacked ribbons.

BRIEF DESCRIPTION OF THE DRAWINGS

The principles and advantages of the present invention can be more clearly understood from the following detailed description considered in conjunction with the following drawings, in which the same reference numerals denote the same structural elements throughout, and in which.

DETAILED DESCRIPTION OF THE INVENTION

Amorphous magnetic materials may combine good soft magnetic properties and low core loss. Compositions may include T70-90X10-30 at. %, where T may represent any combination of transition magnetic metals (e.g., Fe, Co and/or Ni), X may refer to metalloid elements (e.g., Si and/or B) and/or refractory metals (e.g., Nb, Mo, Zr, Hf, Cu and/or the like). Non-magnetic elements may improve glass formation and stabilization of an amorphous structure.

Amorphous soft magnetic ribbons may be prepared by a melt-spinning technique. A rotating disk may be cooled internally by water and/or liquid nitrogen. A thin stream of liquid may be dripped on to the disk and cooled, causing rapid solidification. The high and/or increased cooling rates may be on the order of about 104-107 Kelvins per second (K/s). Such cooling rates may result in amorphous microstructures with reduced atomic long-range order (e.g., no long range order), and may exhibit a short-range order (e.g., only a short range order) with a structural correlation length of the order of atomic distances. Further, such cooling rates may limit ribbon thickness to values below about 50 µm.

The soft magnetic properties of amorphous ribbons may be explained using a random anisotropy model. In the model, magnetic anisotropy axes randomly vary their orientation over the scale of the structural correlation length D (D~atomic scale for amorphous materials). However, ferromagnetic exchange interactions force the magnetic moments to align in parallel, thus impeding magnetization to follow the local easy axis. Consequently the effective magnetic anisotropy may be an average over several structural units, and will be reduced in magnitude.

The magnetic properties of amorphous ribbons may be further tailored by magnetic field annealing and/or tensile stress annealing. Both may yield uniform uniaxial anisotropy. Magnetic field annealing may induce uniaxial anisotropy with its easy axis along the applied magnetic field direction during the heat treatment. The anisotropy may be formed by thermally activated directional atomic ordering along the direction of the local magnetization in order to minimize the spin orbit coupling energy. The annealing temperature may be below Curie temperature (e.g., about 200° C. to about 400° C.). The induced anisotropy constant Ku may be varied by appropriate choice of the annealing temperature and time. Under certain annealing conditions, exchange coupling effect or exchange bias behavior may be observed in amorphous ribbons.

Figure 1B:
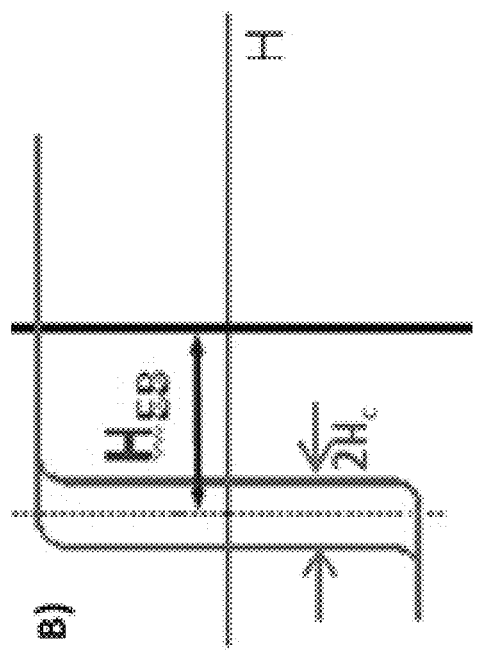
FIG. 1B is an illustration of an exchange biased hysteresis loop in accordance with the principles of the present invention.
Figure 1A:
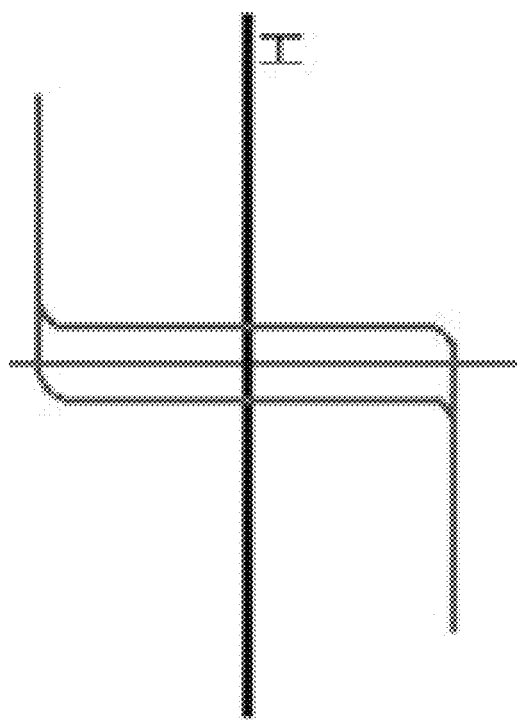
FIG. 1A is an illustration of a hysteresis loop with uniaxial anisotropy in accordance with the principles of the present invention.

FIG. 1A is an illustration of a hysteresis loop with uniaxial anisotropy in accordance with the principles of the present invention. FIG. 1B is an illustration of an exchange biased hysteresis loop in accordance with the principles of the present invention.

Referring to FIG. 1A, a hysteresis loop may exhibit uniaxial anisotropy. Referring to FIG. 1B, exchange bias may manifest itself primarily by a shift of the hysteresis loop along the H field axis (e.g., as shown in FIG. 1B). It may reveal a unidirectional anisotropy, instead of a uniaxial anisotropy. If the loop displacement HEB is larger than the coercive field Hc, the ribbons may remain a single domain state without an external field, as all magnetizations point to one direction.

Exchange bias behavior may be realized by thermal-magnetic annealing under certain conditions. Absent the conditions, exchange coupling may not occur.

Figure 2A:
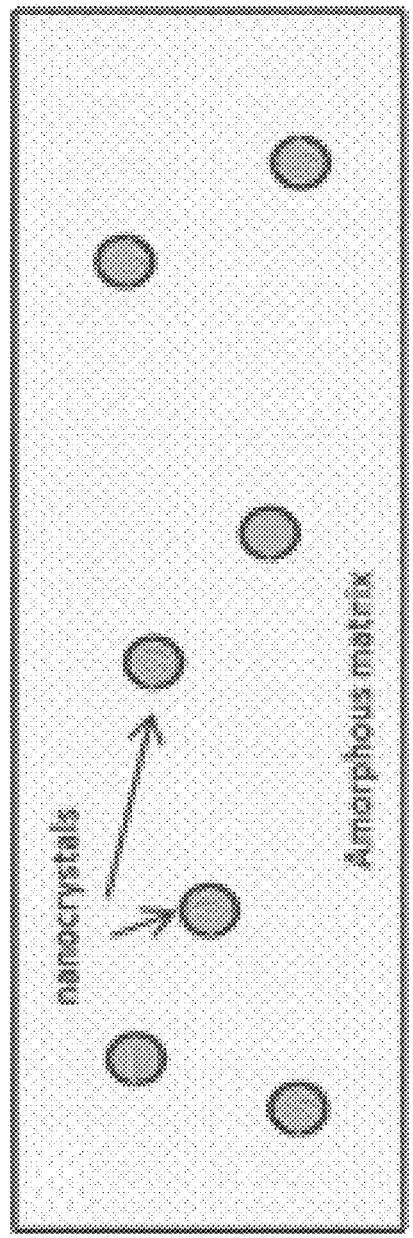
FIG. 2A is an illustration of a partially crystallized amorphous ribbon in accordance with the principles of the present invention.
Figure 2B:
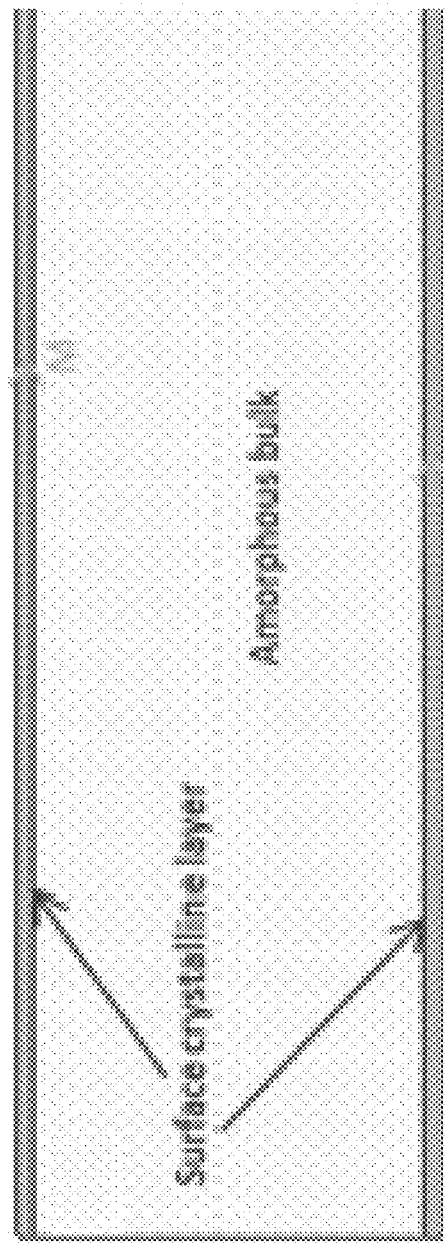
FIG. 2B is an illustration of a partially crystallized amorphous ribbon in accordance with the principles of the present invention.

FIG. 2A is an illustration of a partially crystallized amorphous ribbon in accordance with the principles of the present invention. FIG. 2B is an illustration of a partially crystallized amorphous ribbon in accordance with the principles of the present invention.

Referring to FIGS. 2A and 2B, thermal treatment may be applied to partially crystalize one or more amorphous ribbons, one or more layers of amorphous ribbons, and/or stacks thereof. The annealing temperature may be, for example, about the amorphous ribbon's crystallization temperature or less (e.g., 250-540° C.). The duration of the anneal may be, for example, several minutes to hours. The ribbon(s) may be annealed in, for example, an ambient atmosphere and/or an argon/hydrogen atmosphere. The thermal process may result in, for example, precipitation of a low and/or decreased concentration of magnetically hard crystallites embedded in a soft magnetic amorphous matrix (e.g., as shown in FIG. 2A), and/or a crystalline surface layer may be formed (e.g., as shown in FIG. 2B). These nanocrystals may include, for example, hcp-Co, fcc-Co, Co2B, Co3B, Co2Si, Fe3si, Fe2B grains, a combination thereof and/or the like.

The thermally-treated ribbon(s) may be premagnetized. The thermally-treated ribbon(s) may be, for example, submitted to a DC and/or AC magnetic field, such that the hard magnetic crystallites or surface crystalline layers are polarized, and the magnetizations point to the external field direction. The external field may range from about several to hundreds of Oe. The magnetic field may be generated by the magnetized hard grains or the surface layer may pin the amorphous parts in one direction, which may result in a shifted hysteresis loop.

Thermal annealing and magnetization may occur simultaneously (e.g., without premagnetization).

According to at least one example embodiment, the process may be realized by Joule heating, for example, applying electric current through the ribbon(s).

Electronic stripes may include one or more amorphous ribbons and/or layers of amorphous ribbons, for example, inside one or more coils. A layer of amorphous ribbons may include e two or more ribbons provided side by side. The amorphous ribbons and/or the layers of amorphous ribbons may be stacked (e.g., in alignment to one another) and/or offset at different heights. The number of ribbons, the number of ribbons per layer, and the number of layers of ribbons, are not limited and may each be, for example, 1 to about 20 (e.g., 3 or 10). The ribbons may be about 1.5 mm to about 3.2 mm wide, and about 50 mm to about 85.60 mm long (e.g., about 76 mm long). The amorphous ribbons may have transverse uniaxial anisotropy along the width direction.

Figure 3A:
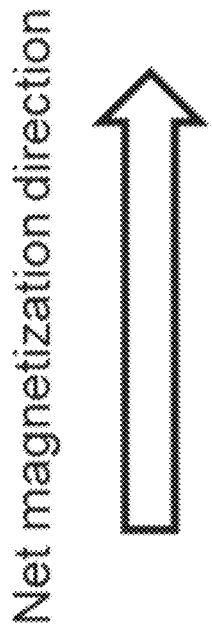
FIG. 3A is an illustration of an amorphous ribbon showing a net magnetization in accordance with the principles of the present invention.
Figure 3A:
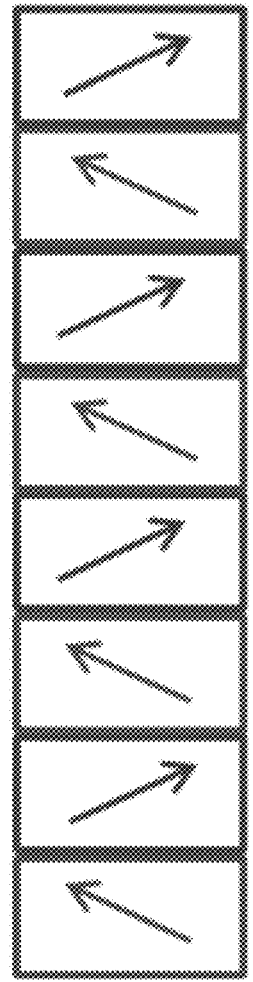
Figure 3B:
FIG. 3B is an illustration of an amorphous ribbon showing a net magnetization in accordance with the principles of the present invention.
Figure 3B:
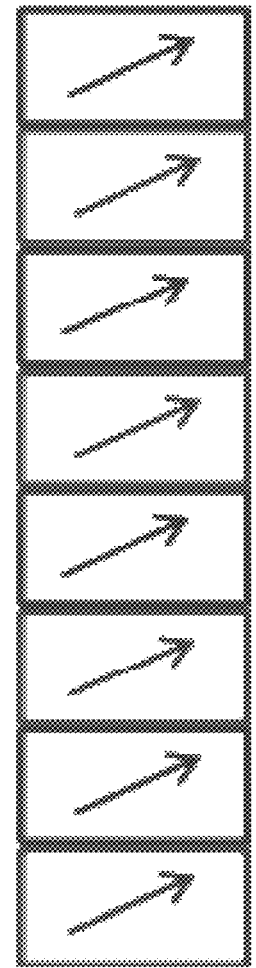
Figure 4:
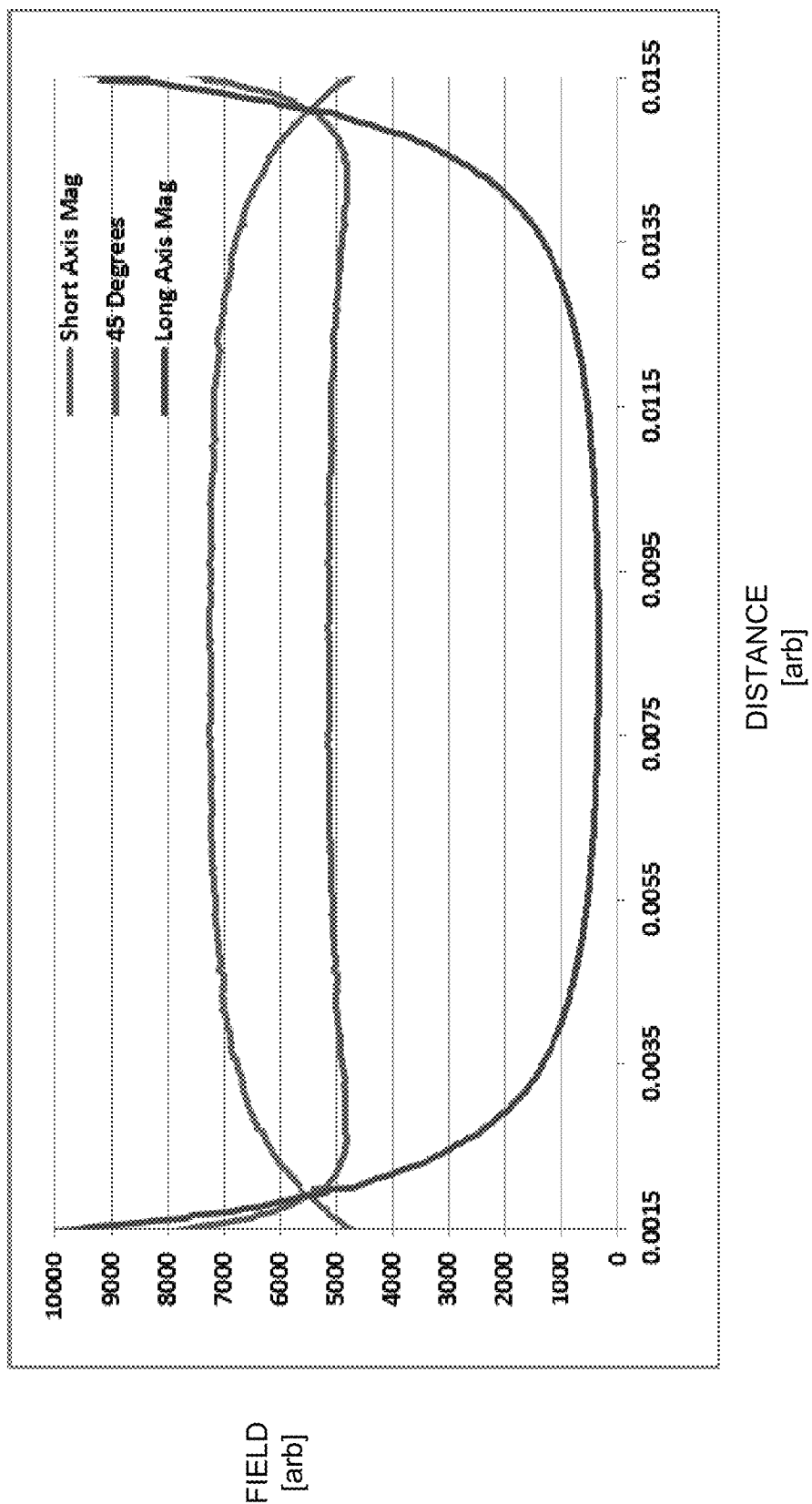
FIG. 4 is a graph showing field profiles in accordance with the principles of the present invention.

FIG. 3A is an illustration of an amorphous ribbon showing a net magnetization in accordance with the principles of the present invention. FIG. 3B is an illustration of an amorphous ribbon showing a net magnetization in accordance with the principles of the present invention. FIG. 4 is a graph showing field profiles in accordance with the principles of the present invention.

Referring to FIG. 3A, the magnetization may break into magnetic domains with opposite directions (e.g., as shown in FIG. 3A). When a driving current is applied through the coil, the generated magnetic field may rotate the magnetizations inside each domain. The change of magnetization in the transverse direction may cancel each other among opposite domains, and net magnetization change may occur in the longitudinal direction (e.g., as shown in FIG. 3A). Magnetizing a ribbon along the length may provide a field profile that peaks at the end and is low in the center (e.g., as shown in FIG. 4). The field may provide reduced and/or low (e.g., very low) and non-uniform signals when the stripe is swiped through a reader.

Referring to FIG. 3B, to improve the signal profile, one or more permanent magnets may be provided (e.g., beneath the coils), and may magnetize the core ribbons into a single domain state (e.g., as shown in FIG. 3B). A driving current (e.g., through the coil(s)) may produce a field that rotates all the magnetizations uniformly (e.g., due to the single domain state), producing a high and/or improved, and uniform, field profile above the stripes (e.g., as shown in FIG. 4).

The presence of a strong magnetic field may cause several reading issues with some magnetic stripe readers. For example, the field variation near the ends may produce a pulse when a magnetic stripe reader passes across. This pulse may be misinterpreted as transmitted information, resulting in a reading error. Field variation along the permanent magnet length may also generate a noise signal, which may compromise the transmitted data.

According to example embodiments, an exchange coupled amorphous ribbons may not require permanent magnets, may reduce or eliminate the strong magnetic field from the electronic stripe, while providing core ribbons in a single domain state. The simplified structure of the electronic stripe may reduce production cost, and may reduce the overall thickness of the stripe to meet, for example, credit card specification (e.g., ISO 7813) and/or provide space for additional components, routing, and/or the like.

Figure 5A:
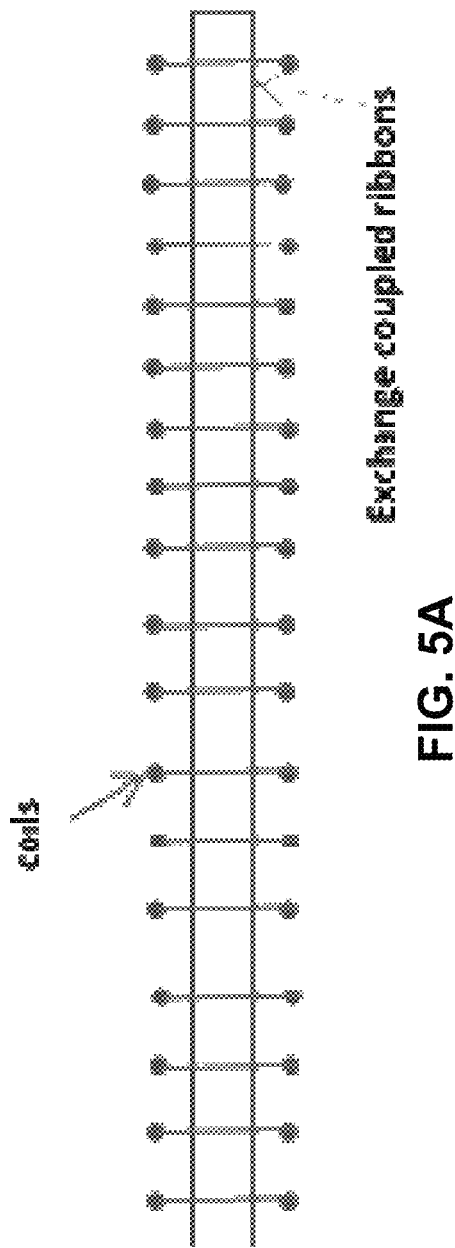
FIG. 5A is a plan view illustration of a magnetic stripe track in accordance with the principles of the present invention.
Figure 5B:
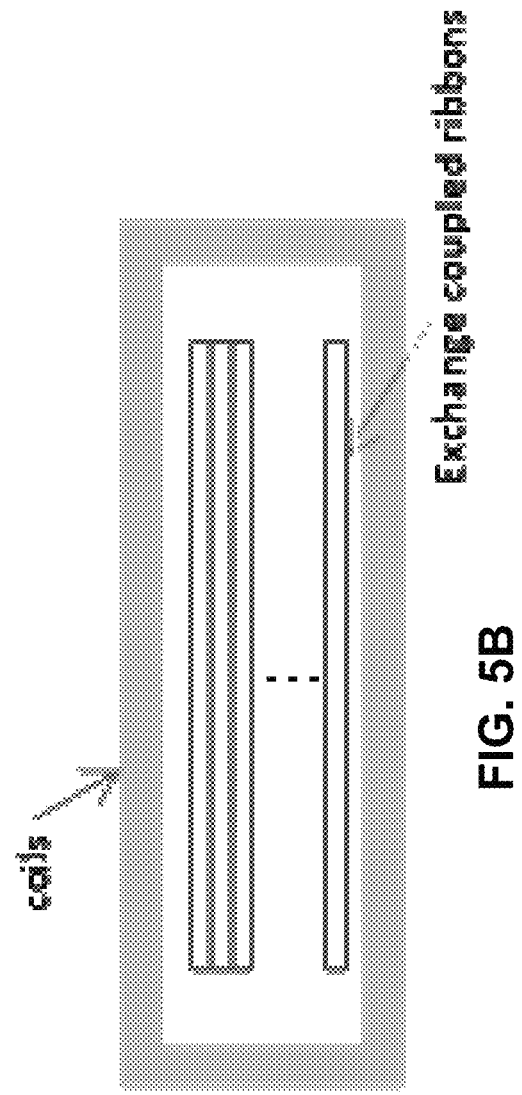
FIG. 5B is a cross-sectional illustration of a magnetic stripe track in accordance with the principles of the present invention.

FIG. 5A is a plan view illustration of a magnetic stripe track in accordance with the principles of the present invention. FIG. 5B is a cross-sectional illustration of a magnetic stripe track in accordance with the principles of the present invention.

According to example embodiments, an electronic stripe track may include one or more layers of exchange coupled ribbons, placed inside one or more conducting coils (e.g., as shown in FIGS. 5A and 5B). Each layer of ribbons may be about 10 um to about 30 um thick (e.g., about 20 um thick), about 1.5 mm to about 3.2 mm wide (e.g., about 2.35 mm wide), and about 50 mm to about 85.60 mm long (e.g., about 76 mm long). The exchange bias direction may be aligned to one direction along the width for all layers or oppositely for adjacent layers. The varying electrical current through the coils may rotate the ribbon magnetization at various angles, thus modifying the magnetic field above the stripe. A reader adjacent to the stripe may sense the change of this magnetic flux, and may produce a signal pulse representing the transmitted signal.

According to some example embodiments, no permanent magnet is included to magnetize the core ribbons into a single domain state. According to some example embodiments, no permanent magnet is included to otherwise bias a signal from the one or more coils. According to some example embodiments, no permanent magnet is included in a card including exchange coupled amorphous ribbons.

Figure 6:
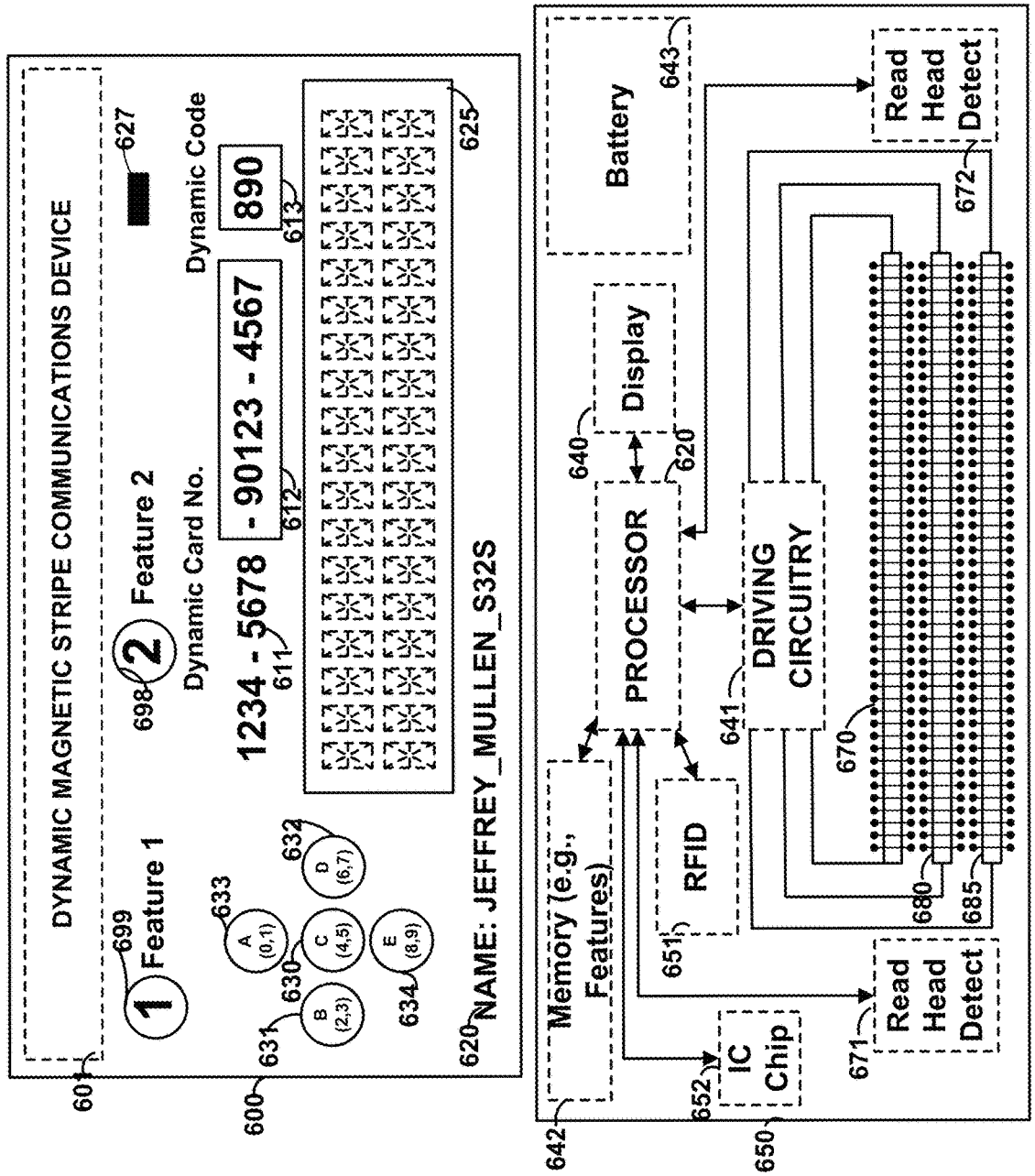
FIG. 6 is an illustration of an electronic device and architecture constructed in accordance with the principles of the present invention.

FIG. 6 is an illustration of an electronic device and architecture constructed in accordance with the principles of the present invention.

Referring to FIG. 6, card 600 may include, for example, a dynamic number that may be entirely, or partially, displayed via display 612. A dynamic number may include a permanent portion such as, for example, permanent portion 611. Permanent portion 611 may be printed as well as embossed or laser etched on card 600. Multiple displays may be provided on a card. For example, display 613 may be utilized to display a dynamic code such as a dynamic security code. Display 625 may also be provided to display logos, barcodes, as well as multiple lines of information. A display may be a bi-stable display or non bi-stable display. Permanent information 620 may also be included and may include information such as information specific to a user (e.g., a user's name or username) or information specific to a card (e.g., a card issue date and/or a card expiration date).

Card 600 may include one or more buttons such as buttons 630-634. Such buttons may be mechanical buttons, capacitive buttons, or a combination or mechanical and capacitive buttons. Card 600 may include button 699. Button 699 may be used, for example, to communicate information through dynamic magnetic stripe communications device 601 indicative of a user's desire to communicate details of a financial transaction to a third-party service provider. Persons skilled in the art will appreciate that pressing a button (e.g., button 699) may cause information to be communicated through device 601 when an associated read-head detector detects the presence of a read-head of a magnetic stripe reader. Button 698 may be utilized to communicate (e.g., after button 698 is pressed and after a read-head detects a read-head of a reader) information indicative of a user selection (e.g., to communicate of details a financial transaction to a different third-party service provider as may be selected by pressing button 699). Multiple buttons may be provided on a card and each button may be associated with different user selections.

Light sensor 627 may be provided, for example, to receive information from a display (e.g., a display of a mobile telephonic device or a laptop computer). Display 625 may allow a user to select (e.g., via buttons) options on the display that instruct the card to communicate (e.g., via a dynamic magnetic stripe communications device, RFID, or exposed IC chip) to use a debit account, credit account, pre-paid account, or point account for a payment transaction.

Button 698 and button 699 may each be associated with, for example, a different third party service provider feature and may be changed by a user at any time. The third party feature associated with a button may be changed by a user on a GUI provided by a device provider, remote facility provider, card issuer, processor, or any other entity. For example, a third party service provider may, on its website or application, allow a user to change the third party feature performed when the third parties' feature button is selected by a user on the user's card or other device. For example, suppose a third party service provider provides a check-in feature at particular stores and then presents the fact that the user has checked into a location on a profile page of the user. One action may be to check into the location using a payment transaction as the check-in. When a transaction is performed, a user's profile may be updated that the user has checked-into that location. When a purchase transaction is performed, a user's profile may be updated that the user has made a purchase at the check-in.

Another action may be to use a purchased product as the check-in. When a transaction is performed, a user's profile may be updated that the user has made a purchase of a particular item at the check-in. For example, a user may be provided with a GUI (e.g., on a mobile telephonic device of the user) when the user makes a purchase to identify the goods that the user has purchased. In doing so, features may be enhanced with additional information from a user after a purchase has been made.

The selection of a feature may or may not have a cost associated with it. If a cost is associated with the feature, for example, the cost may be added to a customer's statement (e.g., added to a credit or debit purchase) for a particular transaction. A fixed-fee or variable-fee (e.g., a percentage of the transaction) may then be removed from the fee charged to the user and distributed among particular parties (e.g., distributed among the card issuer and/or device provider). The remainder of the fee may be provided, for example, to the third party service provider.

A cost may be associated with a feature selection, but may not be a cost to a user. Instead, for example, the cost may be a cost to a third party service provider. The cost may be provided, for example, to other entities such as, for example, the device provider, card issuer, card processor (which may be the same, for example, as the card issuer), or any other entity (e.g., card network).

Architecture 650 may be utilized with any card. Architecture 650 may include processor 620. Processor 620 may have on-board memory for storing information (e.g., financial features). Any number of components may communicate to processor 620 and/or receive communications from processor 620. For example, one or more displays (e.g., display 640) may be coupled to processor 620. Persons skilled in the art will appreciate that components may be placed between particular components and processor 620. For example, a display driver circuit may be coupled between display 640 and processor 620.

Memory 642 may be coupled to processor 620. Memory 642 may include data, for example, that is unique to a particular card. Memory 642 may include any type of data. For example, memory 642 may store discretionary data codes associated with buttons of a card (e.g., card 600 of FIG. 6). Such codes may be recognized by remote servers to effect particular actions. For example, a code may be stored on memory 642 that causes a third party service feature to be performed by a remote server (e.g., a remote server coupled to a third party service such as an online voucher or coupon provider). Different third party features may be associated with different buttons. Or, for example, a user may scroll through a list of features on a display on the front of the card (e.g., using buttons to scroll through the list). A user may select the type of payment on card 600 via manual input interfaces corresponding to displayed options on display 625. Selected information may be communicated to a magnetic stripe reader via a dynamic magnetic stripe communications device. Selected information may also be communicated to a device (e.g., a mobile telephonic device) having a capacitive sensor or other type of touch sensitive sensor.

A card may include, for example, any number of light sensors. Light sensors may be utilized such that a display screen, or other light emitting device, may communicate information to light sensors 627 via light.

Any number of reader communication devices may be included in architecture 650. For example, IC chip 652 may be included to communicate information to an IC chip reader. IC chip 652 may be, for example, an EMV chip. As per another example, RFID 651 may be included to communicate information to an RFID reader.

A magnetic stripe communications device may also be included to communicate information to a magnetic stripe reader. Such a magnetic stripe communications device may provide electromagnetic signals to a magnetic stripe reader. Different electromagnetic signals may be communicated to a magnetic stripe reader to provide different tracks of data. For example, electromagnetic field generators 670, 680, and 685 may be included to communicate separate tracks of information to a magnetic stripe reader. Such electromagnetic field generators may include a coil winding around one or more materials, for example, one or more amorphous materials. For example, the one or more materials may include one more amorphous ribbons (e.g., one more amorphous, soft magnetic ribbons; one or more layers of amorphous, soft magnetic ribbons; and/or one or more stacked layers of amorphous ribbons). Each electromagnetic field generator may communicate information serially to a receiver of a magnetic stripe reader for particular magnetic stripe track. Read-head detectors 671 and 672 may be utilized to sense the presence of a magnetic stripe reader (e.g., a read-head housing of a magnetic stripe reader). This sensed information may be communicated to processor 620 to cause processor 620 to communicate information serially from electromagnetic generators 670, 680, and 685 to magnetic stripe track receivers in a read-head housing of a magnetic stripe reader. Accordingly, a magnetic stripe communications device may change the information communicated to a magnetic stripe reader at any time.

Processor 620 may, for example, communicate user-specific and card-specific information through RFID 651, IC chip 652, and electromagnetic generators 670, 680, and 685 to card readers coupled to remote information processing servers (e.g., purchase authorization servers). Driving circuitry 641 may be utilized by processor 620, for example, to control electromagnetic generators 670, 680, and 685.

Although example embodiments may be disclosed with respect to cards, example embodiments are not so limited. For example, fixed devices (e.g., computing devices) and portable devices (e.g., portable computing devices, such as mobile telephonic devices, PDA's, tablets and/or the like) that may include exchange coupled amorphous magnetic materials as described above are within the scope of example embodiments.

Persons skilled in the art will appreciate that the present invention is not limited to only the embodiments described, and that features described in one embodiment may be used in a different embodiment. The present invention more generally involves dynamic information and devices. Persons skilled in the art will also appreciate that the apparatus of the present invention may be implemented in other ways than those described herein. All such modifications are within the scope of the present invention, which is limited only by the claims that follow.

What is claimed is:

1. A mobile telephonic device, comprising:
   an exchange coupled amorphous material; and
   a dynamic magnetic communications device operable to serially communicate magnetic stripe data to a magnetic stripe reader.

2. The mobile telephonic device of claim 1, further comprising a display.

3. The mobile telephonic device of claim 1, further comprising a button.

4. The mobile telephonic device of claim 1, further comprising a light emitting diode.

5. The mobile telephonic device of claim 1, wherein the exchange coupled amorphous material includes magnetically hard crystallites embedded in a soft magnetic amorphous matrix.

6. The mobile telephonic device of claim 1, wherein the exchange coupled amorphous material includes at least one crystalline surface layer.

7. The mobile telephonic device of claim 1, wherein the exchange coupled amorphous material includes a first exchange coupled ribbon and a second exchange coupled ribbon.

8. The mobile telephonic device of claim 1, wherein the exchange coupled amorphous material is a soft magnetic material.

9. The mobile telephonic device of claim 1, wherein the exchange coupled amorphous material is at least part of a material ribbon.

10. The mobile telephonic device of claim 1, wherein the exchange coupled amorphous material is at least part of a material ribbon, and
    the mobile telephonic device includes a plurality of stacked ribbons.

* * * * *